(12) United States Patent
Schwarz et al.

(10) Patent No.: US 10,692,145 B2
(45) Date of Patent: *Jun. 23, 2020

(54) SYSTEM AND METHOD FOR PRE-MARSHALLING MESSAGES IN AN ELECTRONIC TRADING ENVIRONMENT

(71) Applicant: TRADING TECHNOLOGIES INTERNATIONAL INC., Chicago, IL (US)

(72) Inventors: Stephen A. Schwarz, Prospect Heights, IL (US); Peter A. Levenberg, Naperville, IL (US); John Arvanites, Huntley, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,979

(22) Filed: May 20, 2019

(65) Prior Publication Data

US 2019/0295171 A1    Sep. 26, 2019

Related U.S. Application Data

(63) Continuation of application No. 14/157,495, filed on Jan. 16, 2014, now Pat. No. 10,346,909, which is a continuation of application No. 11/769,048, filed on Jun. 27, 2007, now Pat. No. 8,793,177.

(51) Int. Cl.
*G06Q 40/04* (2012.01)
(52) U.S. Cl.
CPC .................... *G06Q 40/04* (2013.01)
(58) Field of Classification Search
CPC .................................... G06Q 40/04

USPC ........................................................ 705/37
See application file for complete search history.

(56) References Cited

U.S. PATENT DOCUMENTS

| | | |
|---|---|---|
| 7,624,066 B2 | 11/2009 | Janowski et al. |
| 8,793,177 B1 | 7/2014 | Schwarz et al. |
| 2003/0037153 A1 | 2/2003 | Ouchi |
| 2003/0054885 A1 | 3/2003 | Pinto et al. |
| 2005/0144075 A1 | 6/2005 | Magowan et al. |
| 2006/0106708 A1 | 5/2006 | Abushaban et al. |
| 2007/0294160 A1 | 12/2007 | Brown et al. |
| 2008/0015966 A1 | 1/2008 | Altius |

(Continued)

*Primary Examiner* — Lindsay M Maguire
(74) *Attorney, Agent, or Firm* — McDonnell Boehnen Hulbert & Berghoff LLP

(57) ABSTRACT

System and methods for pre-marshalling messages in an electronic trading environment are provided. Specifically, pre-marshalling messages allows for client and network devices to create messages in response to a defined first condition. Pre-marshalling messages allows a trading system to do more processing up front before the message is needed and when a second condition is satisfied. Thus, when the message is needed no further or very little processing must be performed to generate and send the message. The client and/or network device may allocate a separate, unused, or under-utilized processing thread to the task of creating pre-marshalled messages. Pre-marshalled messages may be stored in memory at the network device until it is determined that the second condition has been satisfied. Once a pre-marshalled message is sent, the unused pre-marshalled messages that were stored in memory may be deleted or may be overwritten with newly pre-marshalled messages.

13 Claims, 4 Drawing Sheets

(56) References Cited

U.S. PATENT DOCUMENTS

2010/0023616 A1 1/2010 Harris
2014/0136390 A1 5/2014 Schwarz et al.

SYSTEM AND METHOD FOR PRE-MARSHALLING MESSAGES IN AN ELECTRONIC TRADING ENVIRONMENT

CROSS REFERENCE TO RELATED APPLICATIONS

This application is a continuation of U.S. patent application Ser. No. 14/157,495, filed Jan. 16, 2014, now U.S. Pat. No. 10,346,909, which is a continuation of U.S. patent application Ser. No. 11/769,048, filed Jun. 27, 2007, now U.S. Pat. No. 8,793,177, the contents of each of which are fully incorporated herein by reference for all purposes.

FIELD OF INVENTION

The present invention is directed to electronic trading. More specifically, the present invention is directed towards pre-marshalling messages in an electronic trading environment.

BACKGROUND

Electronic trading refers to a trading system that matches orders by an electronic trading platform. Current examples of electronic trading platforms include the Chicago Mercantile Exchange ("CME") Globex® trading system, the Chicago Board of Trade ("CBOT") e-cbot, and Eurex, just to name a few. A trading system that matches orders electronically is also referred to herein as an "electronic exchange." Exchanges like the CME and CBOT currently offer trading via open outcry in addition to electronic trading.

With respect to electronic exchanges, traders connect to an electronic trading platform by way of a communication link through their client devices. Once connected, traders select which tradeable objects they wish to trade. As used herein, the term "tradeable object" refers to anything that can be traded with a quantity and/or a price. It includes, but is not limited to, traded events, goods and/or financial products such as stocks, options, bonds, futures, currency, and warrants, as well as funds, derivatives and collections of the foregoing, and all types of commodities, such as grains, energy, and metals. The tradeable object may be "real," such as products that are listed by an exchange, or "synthetic," such as a combination of real products that is created by the user. A tradeable object could actually be a combination of other tradeable objects, such as a class of tradeable objects.

The messages communicated between the electronic exchange and the client device include market information, as well as orders, quotes, acknowledgements, fills, cancels, deletes, cancel and replace, and other well-known financial transaction messages. Although the amount or type of market information published by each exchange often differs, there are some standard pieces of information. Market information may include data that represents just the inside market which refers to the lowest sell price (best ask) and the highest buy price (best bid) at particular point in time. Market information may also include market depth, which refers to quantities available at the inside market and can also refer to quantities available at other prices away from the inside market.

Maintaining a high level of performance and providing the most up to date market information is a challenge even for most current trading systems. The amount of messages sent between a client device and an electronic exchange can be numerous and with the increase in popularity of electronic trading, the volume of messages will continue to increase. Due to the increasing amount of messages sent, received, and processed from an electronic exchange or a network device or a client device, the central processing unit (CPU) capabilities at the network and client devices are extremely overburdened and the network connections and network speed may be overwhelmed or jeopardized by the message traffic.

In an industry where speed is of the utmost importance, overwhelmed and overburdened network and client devices can be extremely detrimental to a trader and can possibly cost the trader profits. It is desirable for trading systems to send and receive messages with the most up to date and accurate information at all times. However, instead of providing the trader with messages containing near real-time information regarding the market, orders, etc. many current trading systems have succumbed to an increased delay in processing capabilities.

It is therefore, beneficial to provide a trading system that offers a more efficient method for communicating messages in an electronic trading environment.

SUMMARY

To address these and other objectives, the example embodiments comprise system and methods for pre-marshalling messages in an electronic trading environment. Pre-marshalling a message is directed to the early creation of a message before it is actually needed by a trading system. Specifically, pre-marshalling messages allows for client and network devices to anticipate and create messages in response to a defined condition, such as an action by the trader or a message received from the client device. Pre-marshalling messages also allows a trading system to do more processing up front, such that when the message reply or message request is needed the client or network device has already anticipated a response, and no further or very little processing must be performed by the client or network device. Faster processing of messages also leads to many advantages for the trader such as better queue position, faster response time to market changes, etc. Determining when to send a pre-marshalled response may be user-configurable.

According to an example embodiment, trading systems may anticipate the types of messages that need to be created based on a satisfied first condition, such as the action by the trader, fill information associated with an order, or a message request received. For example, as soon as the trader selects a contract to trade, the trading system will have the information that is needed to pre-marshal an order request message, an inside market request message, or even a market depth request message for that contract. When one of these messages is anticipated to be sent to the network device, such as when the first condition is satisfied, the trading system creates the pre-marshalled message with the specific market information known at that time and then sends the complete message to the network device based on a second defined condition. A second condition might include the receipt of another message, reply from the network device, a submission of an order request, an order getting filled, submission of a delete order, updated market information, or the need for an acknowledgement or error message. Although the amount of messages sent between a client device and a network device may not necessarily differ, the speed at which the messages are anticipated, created, and sent may be significantly increased.

Another example defined first condition may be a trader logging into the trading system or perhaps boot up of a computer device such as a client or network device. The trading system anticipates the types of messages that may be pre-marshalled based on past trading history or configuration files. Specifically, there are many types of traders that trade the same products or types of products on a regular basis. In this instance, the trading system may anticipate the messages to pre-marshall and some of the information to seed the pre-marshalled messages with based on either near term or long term history or configuration files. For example, if the trader is trading the same contract as the previous day, the pre-marshalled messages can all be seeded with the contract type, exchange name, etc. Once further information is known for a specific pre-marshalled message, such as if the second condition is defined as an order request or an order deletion/cancellation, that information may be added to the pre-marshalled message before it is sent.

In another example embodiment, if the first condition is defined as when the network device receives an order request message from a client device, the network device can anticipate the need for a message and pre-marshall an order accept reply message and/or an order reject reply message that may be sent back to the client device when a second condition is satisfied. In this instance, where no further market information needs to be added to the pre-marshalled message, the second condition may simply be the need for a message, at which time the pre-marshalled message is sent. The trading system is programmed to know that, once the network device passes the order request onto the electronic exchange, the electronic exchange will send back either an accept or reject message. Pre-marshalled reply messages will be ready to send to the client device as soon as they are needed, such as when the second condition is defined as a response that is received from the electronic exchange, instead of the network device using system resources and processing power to create the full message at a later point in time. The network device may also send out a pre-marshalled message with more up-to-date market information is received from the electronic exchange. Alternatively, the network device may also anticipate messages that may be pre-marshalled before being sent to the electronic exchange. Pre-marshalling a message request or reply may include the client and network devices allocating a separate, unused, or under-utilized processing separate thread to begin creating possible messages.

According to the example embodiments, a pre-marshalled message may be stored in memory at the client or network device until the main processing is completed and any new information that should be added to the message is known. Specifically, the pre-marshalled message may be stored until the first and/or second conditions are satisfied. For example, a message request may be sent by a client device for updated market information. As soon as the trader selects the contract for which the updated market information is needed, such that the first condition is satisfied, the client device may pre-marshall the message request so that it is ready to be sent to the network device even before the trader has made the command to send the message. The anticipated pre-marshalled message request is stored in memory until the second condition is satisfied, and the message is ready to be sent to the network device. Once received at the network device, a message reply may also be anticipated and pre-marshalled with the updated market information known at that time, while waiting for the rest of the market information from the electronic exchange. Once the updated market information is received from the electronic exchange, thereby satisfying the second defined condition, the updated market information is appended to the already pre-marshalled message waiting in memory to be sent back to the client device.

Alternatively, the network device may send a preliminary message response to a message request with the limited market information that is known at that current time. Once further information is known, the corrected or updated market information is sent to the client device as an additional message in the form of a final message response. The preliminary and the final messages may, for example, be associated to one another based on a unique ID or unique order key. A unique identifier would allow the trading system to correctly associate the exact information to include in a final message based on the information that was included in the preliminary message. Sending only the corrected or updated market information to the client device in a final message may decrease processing time as well as decrease the size of messages.

The above example system and method illustrates a way to pre-marshall messages in an electronic trading environment. Other examples are provided herein. Modifications may also be made to the system and methods without departing from the spirit or scope of the invention. Additional features and advantages of the example embodiments will be set forth in the description that follows. The features and advantages of the example embodiment may be realized and obtained through the embodiments particularly pointed out in the appended claims. These and other features will become more fully apparent from the following description and appended claims, or may be learned by the practice of the example embodiments as set forth hereinafter.

BRIEF DESCRIPTION OF THE DRAWINGS

Example embodiments are described herein with reference to the following drawings, in which.

DETAILED DESCRIPTION

I. A First Example Trading System

Figure 1:
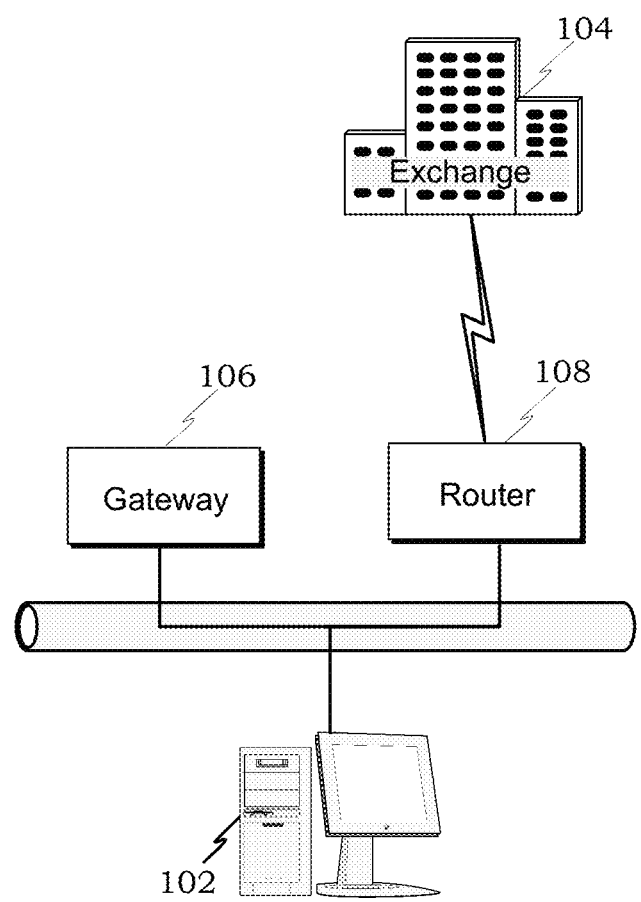
FIG. 1 illustrates a trading system for electronic trading according to an example embodiment, wherein the trading system includes a trading station where a trader can submit bids and offers for a tradeable object being traded at an electronic exchange.

FIG. 1 illustrates an example electronic trading system in which the example embodiments may be employed. However, it should be understood that the example embodiments could be equally applicable in different embodiments and in relation to different systems as well, such as by other computer programs or systems that do not necessarily relate to electronic trading (e.g., operating systems, gaming systems, and/or other software applications). In this example, the trading system comprises a client device 102 that accesses an electronic exchange 104 through a gateway 106. Router 108 is used to route messages between the gateway 106 and the electronic exchange 104. The electronic exchange 104 includes a computer process (e.g., the central computer) that matches buy and sell orders sent from the client device 102 with orders from other client devices (not shown). The electronic exchange 104 may list one or more tradeable objects for trading. While not shown in FIG. 1 for the sake of clarity, the trading system may include other devices that are specific to the client site like middleware and security measures like firewalls, hubs, security managers, and so on, as understood by a person skilled in the art.

Regardless of the types of order execution algorithms used, the electronic exchange 104 provides market information to the subscribing client device 102. Market information may include data that represents just the inside market. The inside market is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually, although not necessarily, provided by the host exchange in aggregate sums. In other words, an exchange usually provides the total buy quantity and the total sell quantity available in the market at a particular price level in its data feed. The extent of the market depth available to a trader usually depends on the exchange. For instance, some exchanges provide market depth for all (or most) price levels, while some provide only quantities associated with the inside market, and others may provide no market depth at all. Additionally, the exchange 104 can offer other types of market information such as the last traded price (LTP), the last traded quantity (LTQ), and order fill information.

The computer employed as the client device 102 generally can range from a handheld device, laptop, or personal computer to a larger computer such as a workstation with multiple multiprocessors. Generally, the client device 102 includes a monitor (or any other output device) and an input device, such as a keyboard, a trackball, and/or a two or three-button mouse to support click based trading, if so desired. One skilled in the art of computer systems will understand that the present example embodiments are not limited to any particular class or model of computer employed for the client device 102 and will be able to select an appropriate system.

The network device employed as the gateway 106 generally can range from a personal computer to a larger or faster computer. Generally, the gateway 106 may additionally include a monitor (or any other output device), input device, and access to a database, if so desired. One skilled in the art of computer systems will also understand that the present example embodiments are not limited to any particular class or model of computer(s) employed for the gateway 106 and will be able to select an appropriate system.

It should be noted that a computer system that may be employed here as a client device or a network device or gateway generally includes a central processing unit, a memory (a primary and/or secondary memory unit), an input interface for receiving data from a communications network, an input interface for receiving input signals from one or more input devices (for example, a keyboard, mouse, etc.), and an output interface for communications with an output device (for example, a monitor). A system bus or an equivalent system may provide communications between these various elements.

In general, it should be understood that the devices described herein could include hardware objects developed using integrated circuit development technologies, or yet via some other methods, or the combination of hardware and software objects that could be ordered, parameterized, and connected in a software environment to implement different functions described herein. Also, the hardware objects could communicate using electrical signals, with states of the signals representing different data.

It should also be noted that the client device 102 generally executes application programs resident at the client device 102 under the control of the operating system of the client device 102. Also, the gateway 106 executes application programs resident at the gateway 106 under the control of the operating system of the gateway 106. In other embodiments and as understood by a person skilled in the art, the function of the application programs at the client device 102 may be performed by the gateway 106, and likewise, the function of the application programs at the gateway 106 may be performed by the client device 102.

The actual electronic trading system configurations are numerous, and a person skilled in the art of electronic trading systems would be able to construct a suitable network configuration. For the purposes of illustration, some example configurations are provided to illustrate where the elements may be physically located and how they might be connected to form an electronic trading system. These illustrations are meant to be helpful to the reader, and they are not meant to be limiting. According to one example illustration, the gateway device may be located at the client site along with the trading station, which is usually remote from the matching process at the electronic exchange. According to this instance, the trading station, the gateway, and the router may communicate over a local area network, and the router may communicate with the matching process at the electronic exchange over a T1, T3, ISDN, or some other high speed connection.

In another example illustration, the client site may be located on the actual grounds of the electronic exchange (for example, in the building of the exchange). According to this instance, the trading station, the gateway, and the router may still communicate over a local area network, but the router may communicate with the matching process at the electronic exchange through another connection means besides a T1, T3, or ISDN. In yet another example illustration, the gateway may be housed at, or near, its corresponding electronic exchange. According to this instance, the client device may communicate with the gateway over a wide area network or through the use of a T1, T3, ISDN, or some other high speed connection.

Further, the gateway may be located remote from the client device and remote from the electronic exchange, which might be particularly useful in systems that include interconnection of multiple trading networks. Thus, one trading network might have gateway access to an electronic exchange. Then, other trading networks may communicate with the trading network that has gateway access through a T1, T3, ISDN, or some other high speed connection.

II. A Second Example Trading System

Figure 2:
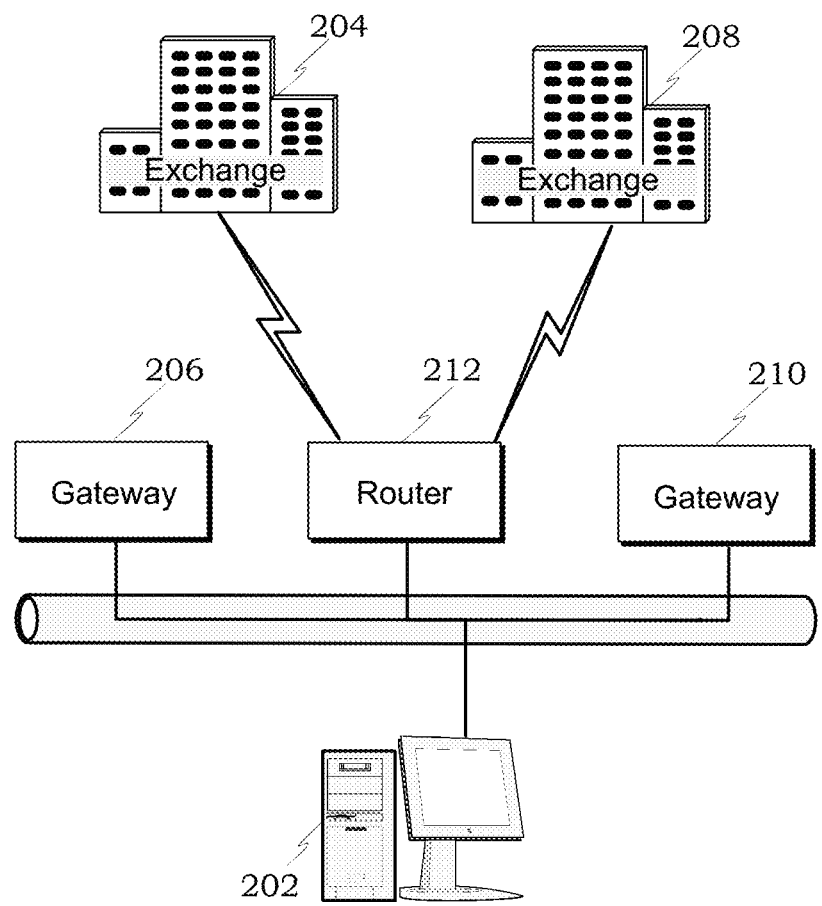
FIG. 2 illustrates another trading system for electronic trading according to another example embodiment, wherein this trading system includes a trading station where a trader can submit bids and offers for a tradeable object being traded at more than one electronic exchange.

FIG. 2 illustrates another example trading system that uses similar computer elements as shown in FIG. 1, in which a trader may access and trade at multiple electronic exchanges. The system comprises a client device 202 that can access multiple electronic exchanges 204 and 208. In this particular embodiment, electronic exchange 204 is accessed through gateway 206 and electronic exchange 208 is accessed through another gateway 210. Alternatively, a single gateway may be programmed to handle more than one electronic exchange. Router 212 is used to route messages between the gateways 206 and 210 and the electronic exchanges 204 and 208. While not shown in the figure, the system may include other devices that are specific to the client site like middleware and security measures like firewalls, hubs, security managers, and so on, as understood by a person skilled in the art. Additional electronic exchanges may be added to the system so that the trader can trade at any number of exchanges, if so desired.

The trading system presented in FIG. 2 provides the trader with the opportunity to trade tradeable objects listed at different electronic exchanges. To some traders, there can be many advantages with a multi-exchange environment. For example, a trader could view market information from each tradeable object through one common visual display. As such, price and quantity information from the two separate exchanges may be presented together so that the trader can view both markets simultaneously in the same window. In another example, a trader can spread trade different tradeable objects listed at the different electronic exchanges.

As indicated earlier, one skilled in the art of electronic trading systems will understand that the present embodiments are not limited to the particular configurations illustrated and described with respect to FIG. 1 and FIG. 2, and will be able to design a particular system based on the specific requirements (for example, by adding additional exchanges, gateways, client devices, routers, or other computers serving various functions like message handling and security). Additionally, several networks, like either of the networks shown in FIG. 1 or FIG. 2, may be linked together to communicatively access one or more electronic exchanges.

III. Client Device

Client devices 102 and 202 can be computers, such as a workstation, desktop, laptop, handheld device, and so forth, that allow a trader to trade one or more tradeable objects that are offered at exchange(s). A client device may include at least processor and memory. Preferably, the processor has enough processing power to handle and process various types of market information. The more market information is received and processed, the more processing power is preferred.

Memory may include a computer readable medium. The term computer readable medium, as used herein, refers to any medium that participates in providing instructions to a processor unit for execution. Such a medium may take many forms, including but not limited to, nonvolatile media, and transmission media. Non-volatile media include, for example, optical or magnetic discs, such as storage devices. Volatile media include, for example, dynamic memory, such as main memory or random access memory ("RAM"). Common forms of computer readable media include, for example, floppy discs, flexible disks, hard discs, magnetic tape, punch cards, CD-ROM, any other physical medium, memory chip or cartridge, or any other medium from which a computer can read.

When a client device receives market information or other data, such as news, or charting data, and order related information from an exchange, the received information may be displayed to the trader(s) on the visual output device or display device. However, it should be understood that the information could be provided to a trader using other means such as sound. The output device can be any display device.

Upon viewing the market information or a portion thereof, a trader may wish to send orders to an exchange, cancel orders, change orders, query an exchange, and so on. To do so, the trader may input various commands or signals into a client device such as by typing into a keyboard, inputting commands through a mouse, or inputting commands or signals through some other input device. For instance, a trader may click a mouse button to initiate an order to buy a particular quantity of the tradeable object at a particular price. Then, a client device preferably generates transaction information. There are many different types of messages and/or order types that can be submitted, all of which may be considered various types of transaction information. Once generated, transaction information is sent from a client device to one or more electronic exchanges over communication links.

In one example embodiment, a client device uses software to create specialized interactive trading screens on terminals associated with them. Trading screens preferably enable traders to, among other things, enter and execute orders, obtain market quotes, and monitor positions. The range and quality of features available to the trader on his or her trading screen may vary according to the specific software application being run. In addition to or in place of the interactive trading screens, a client device could run automated types of trading applications.

IV. Message Flow Diagram

Figure 3:
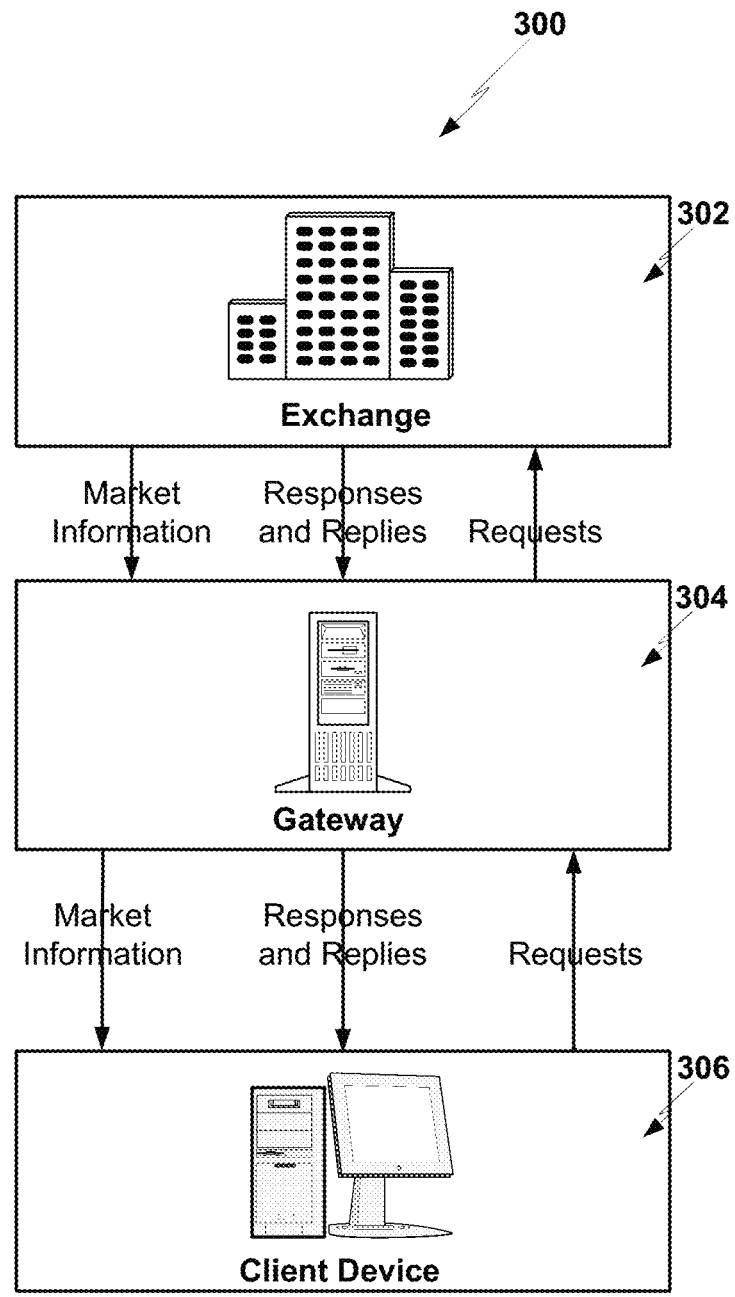
FIG. 3 illustrates a data flow diagram that demonstrates an example flow of information between the elements shown in FIGS. 1 and 2.

FIG. 3 is a flow diagram illustrating an example operation of either system shown in FIG. 1 or FIG. 2. This message flow diagram provides an example of the flow of market information message by which a user communicates with the electronic exchange, receives market information messages for a selected tradeable object, and trades the tradeable object. FIG. 3 includes an electronic exchange 302, a gateway or network device 304, and a client device 306.

According to an example embodiment, a trader opens a trading application on the client device 306, which allows the trader to subscribe to trade, send, and receive market information message requests associated with one or more tradeable objects that are listed at the electronic exchange 302. For example, the client device 306 may request market information or make an order request to the gateway 304 and/or the electronic exchange 302. Market information may include any information associated with the tradeable object, including the best bid price, the best ask price, the last traded price, other prices outside of the best bid price and ask price, quantities at those given prices, closing price, and settlement price. The actual contents of the message may often depend on the actual electronic exchange or the tradeable object itself.

According to the example embodiments, in response to the satisfied first condition, such as a trader selecting a contract in which to place an order, the client device 306 may pre-marshall an order request message to be sent to the gateway 304. Until the trader is ready to actually make the order request, the pre-marshalled order request message is stored in memory at the client device 306. Once the trader decides to actually submit the order request, thus satisfying the second condition, the pre-marshalled message will be sent to the gateway 304. A variety of message requests can be pre-marshalled at the client device 306. For example, the trading system can assume that the trader will be submitting order requests, market information requests, and even market depth requests associated with the tradeable objects that are being traded. Pre-marshalling these types of message requests saves the client device processing time when the trader decides to actually request that information. Additionally, submitting order requests to the exchange at a faster rate will allow for better queue position, and higher likelihood of the trader's order getting filled.

Another defined first condition may be to pre-marshall messages upon boot up or login to a trading application. This condition may allow for possible messages to be pre-marshalled and saved in memory before the trader starts trading or a gateway starts receiving messages. In this instance, the trading system may pre-marshall the messages based on the trader's past trading history or configuration files.

It should also be understood that unused or un-needed pre-marshalled message requests may be handled in a variety of ways. Specifically, unused pre-marshalled messages may be deleted from memory, such that memory is not taken up by messages that will go unused. In another example, the unused pre-marshalled messages may be saved in memory and then overwritten by the trading system. This method saves the trading system from allocating and de-allocating memory with each pre-marshalled message. Whether or not unused pre-marshalled messages should be deleted or not may be configurable by the user.

According to another example embodiment, the gateway 304 pre-marshalls an acknowledgement, rejected, and/or error reply message in response to the order request message that was received from the client device. These pre-marshalled messages are also stored in memory until a second condition is satisfied. The gateway 304 may then forward the order request message onto the electronic exchange 302 which will then communicate the appropriate message back to the gateway 304. The gateway 304 will receive and process the message. Once the message is received at the gateway 304 from the electronic exchange 302, the appropriate pre-marshalled message is retrieved from memory, any further up to date market information is added to the message, and then the message is immediately sent to the client device, thus reducing the processing time and resources needed to actually create and send the reply message to the client device. Depending on the type of message request sent by the client device 306, the gateway 304 could send back order fill information or other market information.

It should also be understood that the gateway 304 may also pre-marshall messages to be sent to the electronic exchange. For example, the gateway may pre-marshall message requests and acknowledgments to be sent from the gateway to the electronic exchange.

In an additional embodiment, in response to an order request made by the client device 306, the gateway 304 may pre-marshall multiple messages corresponding to the different responses that the electronic exchange 302 could send. For example, the gateway 304 may allocate a separate, unused, or under-utilized processing thread to pre-marshall an "order filled" reply message or an "order cancelled" reply message and store them in memory.

In another example embodiment, processing time may be decreased and message size may be reduced by pre-marshalling partially complete messages replies and requests. For example, the gateway 304 may assume that the order will get filled eventually, so gateway 304 sends a partially complete "order will be filled" message to the client device 306. Once the electronic exchange 302 replies with the complete order fill information, such as fill price and quantity, the gateway 304 can then create and reply with another smaller message that includes the updated order fill market information, therefore taking up less bandwidth.

These partially complete messages may be marked as "preliminary" before being sent to/from the client device 306, such that the client device 306 or the gateway 304 are aware that a more complete or "final" message will be sent shortly. In this case, the client device 306 may store the "preliminary" message in memory until the "final" message with the updated order fill market information arrives. The preliminary and final messages may be associated with each other based on a unique ID or order key. This unique ID or order key will be associated with both the preliminary and the final message. Once a final message is sent, the client device and/or network device may delete any corresponding unused pre-marshalled messages that were stored in memory or save the messages and overwrite them with the next pre-marshalled message.

It should also be understood that the messages that are pre-marshalled by the trading system must also be un-marshalled when they are received at their final destination. Pre-marshalling a message can include some sort of encryption, and un-marshalling a message may include decryption of the pre-marshalled message. Un-marshalling a message transforms the message into a form that is useable the receiver of the message.

V. Pre-Marshalling Messages

Figure 4:
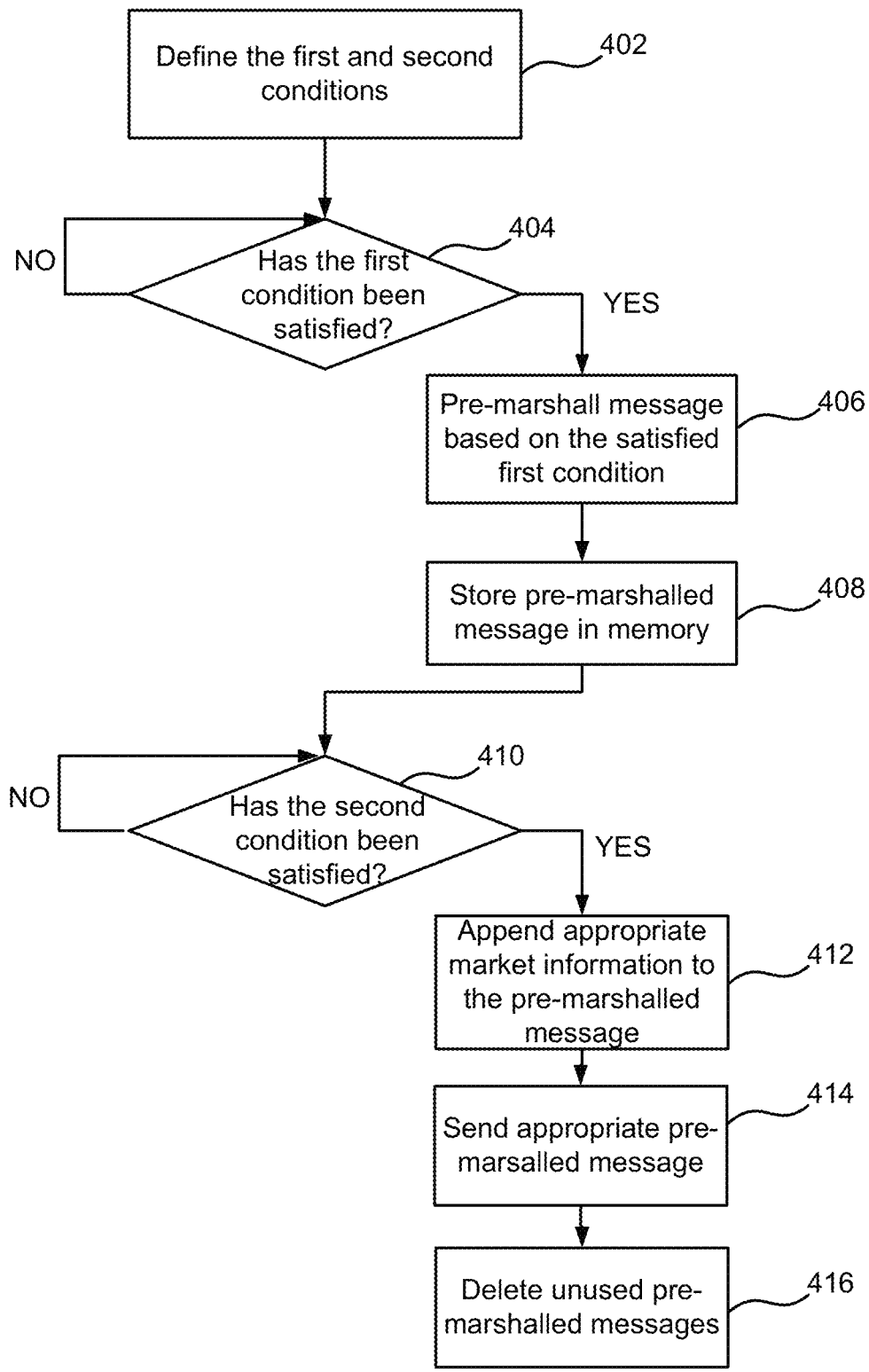
FIG. 4 is a flow chart illustrating an example method for pre-marshalling messages in an electronic trading environment.

FIG. 4 is a flow chart illustrating an example method for pre-marshalling messages in an electronic trading environment. It should be understood that the flow chart only shows the functionality and operation of a possible implementation of the present embodiments. In this regard, each block may represent a module, a segment, or a portion of the program code, which includes one or more executable instructions for implementing specific logical functions or steps in the process. Alternative implementations are included within the scope of the example embodiments of the present invention in which functions may be executed out of order from that shown or discussed, including substantially concurrent or in reverse order, depending on the functionality involved, as would be understood by those reasonably skilled in the art of the present invention.

At step 402, one or more first conditions for creating pre-marshalled messages are defined. A first condition, for example, may be a message request being received from the client device at the gateway. The message request may consist of, for example, an order request, an order deletion/cancellation, or a request for updated market information. Additionally, a condition may be an action by the trader, for example, the selection of a contract for which an order may be placed in, or market information may be requested for. Another example defined condition may be a trader logging into the trading system or perhaps boot up of a computer device such as a client or network device. The trading system may also anticipate the types of messages that may be pre-marshalled based on near term or long term trading history or configuration files.

Additionally, at step 402, one or more second conditions for determining when to send the pre-marshalled messages are defined. A second condition, for example, may be an additional message request being received from the client device at the gateway. A second condition may also be the submission of an order request, submission or order deletion/cancellation, a need for an acknowledgement or error message, updated market information, or an order getting filled at the electronic exchange.

At step 404, the device determines if the first condition has been satisfied.

At step 406, based on the satisfied first condition, different types of messages are pre-marshalled with the market information known at that time.

At step 408, the pre-marshalled messages are stored in memory until the second condition is satisfied.

At step 410, the device determines if the second condition has been satisfied.

At step 412, based on the satisfied second condition and the market information known at that time, the device determines which pre-marshalled message needs further market information appended in order to create a complete message.

At step 414, the device sends the appropriate pre-marshalled message. Once the pre-marshalled message is sent, the unused pre-marshalled message can be deleted or saved.

At step 416, the pre-marshalled message is deleted from memory. As previously stated, the user may configure whether or not pre-marshalled message are deleted or saved and overwritten by the trading system.

Conclusion

The example embodiments discussed above describe a method for pre-marshalling messages in an electronic trading environment. Specifically, pre-marshalling messages allows for client devices and network devices to create messages in response to a defined first condition. A first condition may be defined, for example, as any message received from the client device or the network device, or an action taken by a trader. Pre-marshalling reply messages also allows a trading system to do more processing up front before the message is needed, such that when the message is actually needed no further or very little processing must be performed at the client or network device. Another example defined first condition may be that pre-marshalled messages are created upon login or boot up, where the pre-marshalled messages are based on trading history or a configuration file.

Based on the type of message that is received from the client device, the network device will assign a separate, unused, or under-utilized processing thread to the task of creating pre-marshalled reply messages. Similarly, based on the type of action taken by the trader, the client device will assign a processing thread the task of creating pre-marshalled message requests. The pre-marshalled messages may be stored in memory until it is determined that a message should be sent, or when a second condition is satisfied. A second condition may be defined, for example as the receipt of another message or reply from the network. A second condition may also be the submission of an order request, submission or order deletion/cancellation, a need for an acknowledgement or error message, updated market information, or an order getting filled at the electronic exchange.

A pre-marshalled message may be considered a preliminary message when only partially complete market information is available at that time. Once further market information is known, the trading system will associate the corrected market information with the final message based on a unique ID or a unique order key. This unique ID or order key will be associated with both the preliminary and the final message. Once a final message is sent, the client device and/or network device may delete any corresponding unused pre-marshalled messages that were stored in memory or save the messages and overwrite them with the subsequent pre-marshalled message.

Due to messages being pre-marshalled, processing resources are saved when it is actually time to send a pre-marshalled message. As previously discussed, conventionally, the message requests or replies would not be created until a message was needed. The conventional method takes up more processing time and resources when it is of the utmost importance to send a message as quickly as possible. Pre-marshalling allows for faster processing of messages, which may lead to many advantages such as better queue position for the trader, faster response time to market changes, etc.

The above description of the example embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for pre-marshalling messages in an electronic trading environment may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A system comprising:
a computing device, wherein the computing device comprises an input device,
wherein the computing device is configured to establish an electronic communication link with an electronic exchange, the electronic communication link configured to communicate a plurality of electronic messages from the computing device to the electronic exchange, each electronic messages of the plurality of electronic message having a first portion and a second portion;
wherein the computing device is configured to receive, via the input device, a first user input identifying a first condition for determining whether to assemble a first portion of a message for an electronic communication for an order for a tradeable object from the computing device to the electronic exchange, the message having at least the first portion and a second portion;
wherein the computing device is configured to detect the first condition for determining whether to assemble the first portion of the message;
wherein the computing device is configured to, in response to detecting the first condition, assemble the first portion for the message for the tradeable object, and store the message with the first portion without the second portion of the message, where the stored message with the first portion is incomplete;
wherein the computing device is configured to receive, via the input device, a second user input identifying a second condition for transmitting the message to an electronic exchange;
wherein the computing device is configured to detect the second condition for transmitting the message to an electronic exchange; and
wherein the computing device is configured to, in response to detecting the second condition, assemble the second portion of the message for the tradeable object according to a second set of information available at a second time, append the second portion of the message to the stored incomplete message with the first portion, generate in response to appending, a complete message, where the complete message includes at least the first portion and the second portion, and electronically send, via the electronic communication link, the complete message to the electronic exchange.

2. The system of claim 1 where the complete message comprises an order request message.

3. The system of claim 2 where the second condition comprises a trader submitting the order request message and the second portion comprises price information for the tradeable object selected by the trader at the second time.

4. The system of claim 1 where the complete message comprises a delete order message.

5. The system of claim 4 where the second condition comprises a trigger to send the delete order message.

6. The system of claim 1 where the first condition comprises a login at the computing device.

7. The system of claim 1 where the first condition comprises a user selection of a tradeable object via the computing device.

8. The system of claim 1 where the computing device comprises a client device.

9. The system of claim 1 where the computing device comprises a network device.

10. The system of claim 1 where the first condition comprises sending an electronic trading message.

11. The system of claim 1 where the first portion comprises a preliminary message associated with a unique identification number.

12. The system of claim 11 where the second portion comprises a final message also associated with the unique identification number.

13. The system of claim 1, wherein the computing device is further configured to delete the stored message with the first portion and without the second portion of the message in response to the second condition being satisfied.

* * * * *